United States Patent Office 2,988,474
Patented June 13, 1961

2,988,474
NOVEL INSECTICIDES, ACARICIDES AND NEMATOCIDES

Karoly Szabo, Yonkers, N.Y., and John G. Brady and Thomas Bruce Williamson, Santa Clara, Calif., assignors to Stauffer Chemical Company, New York, N.Y., a corporation of Delaware
No Drawing. Filed July 28, 1960, Ser. No. 45,777
15 Claims. (Cl. 167—30)

The present invention is concerned with certain novel compounds useful as insecticides, acaricides and nematocides, and with novel methods for their preparation.

The compounds of the present invention have the formula

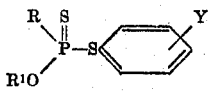

wherein R and R$^1$ are selected from the group consisting of methyl and ethyl and Y is selected from the group consisting of hydrogen and alkyl groups having up to four carbon atoms.

The novel compounds can be made by the reaction of a compound having the formula

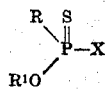

wherein X is chlorine or bromine, with thiophenol or an alkyl substituted thiophenol, preferably in the presence of an alkali in an organic solvent.

The novel compounds of the present invention have a high degree of activity as insecticides, acaricides and nematocides.

When used as pesticides, the compounds of the present invention may be applied as dispersions, as solutions in suitable solvents, such as acetone and the like, or they may be mixed with an inert solid carrier and applied as a powder. For example, they may be made into the form of a wettable powder by the addition of a finely divided ground carrier or diluent such as Attaclay, a finely divided clay, containing a suitable wetting agent such as a higher aliphatic alcohol, sulfate wetting agent. Powders of this sort may readily be mixed with water and applied as dispersions to infested plants.

The following examples are given solely for the purpose of illustration and are not to be construed as limitations of the present invention, many variations of which will occur to those skilled in the art without departing from the spirit or scope thereof.

EXAMPLE I

*O-ethyl-S-p-tolyl-ethylphosphonodithioate (Compound I)*

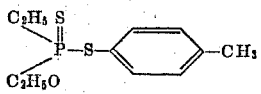

p-Methylbenzenethiol (12.4 g.), O-ethyl-ethylphosphonochloridothioate (17.3 g.) and acetone (70 ml.) are placed in a flask equipped with reflux condenser, thermometer, stirrer and dropping funnel. Triethylamine (10.1 g.) is added dropwise now while the reaction mixture is stirred. The addition is followed by an exothermic reaction with the precipitation of the formed triethylamine hydrochloride. The addition is completed in 10 minutes. The temperature of the reaction mixture rises to 50° C. by that time. Then the mixture is brought to reflux for half an hour in order to complete the reaction.

The amine hydrochloride is removed from the mixture by washing it with water. Traces of the unreacted thiophenol are extracted with a 3% NaOH solution.

The mixture, washed to neutral with water, is dried on MgSO$_4$. The solvent and by-products are removed at reduced pressure and elevated temperature (end point 0.5 mm. and 130° C.). The residue is treated with charcoal and filtered with suction to yield 24 g. of a yellow oil which has a refractive index of 1.5897 at 25° C. Yield 92%. It has been analyzed as follows:
Calcd.: C=50.7%; H=6.5%; S=24.6. Found: C=50.80%; H=6.33%; S=23.66.

EXAMPLE II

*O-ethyl-S-o-tolyl-ethylphosphonodithioate*

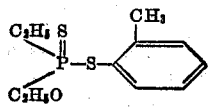

O-methylbenzenethiol (11.7 g.), O-ethyl-ethylphosphonochloridothioate (16.4 g.) and acetone (70 ml.) are brought together and Et$_2$N (10 g.) is added in portions while the mixture is efficiently stirred. An exothermic reaction takes place with the prompt precipitation of the amine hydrochloride. When all the triethylamine is added the mixture is refluxed (58° C.) for 20 minutes then allowed to cool down.

Benzene (70 ml.) is added and the mixture is successively washed with water, 3% NaOH and water again. The benzene layer is separated and dried over anhydrous MgSO$_4$.

Then the solvent is stripped off to obtain a crude oily product in an amount of 18 g. (73% yield) with an N$_D^{25}$ of 1.5918.

The pure compound boils at 135° C. at 0.1 mm. It is a slightly yellowish oil of an N$_D^{25}$ of 1.5892.
*Analysis.*—Calcd.: C=50.7; H=6.5; S=24.6; P=11.9. Found: C=50.78; H=6.63; S=24.15; P=12.21.

EXAMPLE III

*O-ethyl-S-phenyl-ethylphosphonodithioate (Compound II)*

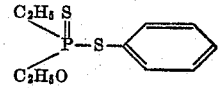

The compound has been prepared by the method described under Example II using thiophenol instead of O-methylbenzenethiol. The crude product, a yellow oil with an N$_D^{25}$ of 1.5888, has been obtained in a yield of 89%. The pure product distills at 130–32° at 0.1 mm. pressure. Its N$_D^{25}$ is 1.5883.
*Analysis.*—Calcd.: C=48.8; H=6.1; P=12.6. Found: C=49.1; H=5.92; P=11.16.

EXAMPLE IV

*O-ethyl-S-(p-tert.-butylphenyl)-ethylphosphonodithioate (Compound III)*

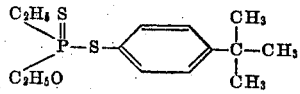

This member of the series has been prepared as described in Example I. The crude product, a straw yellow oil, is obtained in a yield of 95.7%. After distillation ($b_{1.5}$=165° C.) the product solidifies to a white solid which melts at 56° C. after recrystallization from methanol.
*Analysis.*—Calcd: C=55.5; H=7.66; S=21.22. Found: C=55.92; H=7.73; S=20.96.

EXAMPLE V

The homologous O-methyl and methylphosphonodithioate compounds may be prepared by reactions analogous to the examples above, using the corresponding O-methyl and methylphosphonochlorothioates.

The compounds have been tested as insecticides and as acaricides according to the following methods:

*Acaricidal evaluation test.*—The two-spotted mite, *Tetraanychus telarius* (Linn.) is employed in tests for acaricides. Young pinto bean plants are infested with several hundred mites. Dispersions of test compounds are prepared by dissolving half a gram of the toxic material in ten milliliters acetone. This solution is then diluted with water containing 0.015% Vatsol (a sulfonate-type wetting agent) and 0.005% Methocel (methyl cellulose) as emulsifiers, the amount of water being sufficient to give concentrations of active ingredient ranging from 0.25% to 0.005%. The test suspensions are then sprayed on the infested pinto bean plants. After seven and fourteen days, the plants are examined both for post-embryonic forms of the mite as well as eggs. The percentage of kill is determined by comparison with control plants which have not been sprayed and the LD-50 value calculated using well-known procedures.

*Insecticidal evaluation tests.*—Four insect species are subjected to evaluation tests for insecticides:

(1) American cockroach, *Periplaneta americana* (Linn.)
(2) Large milkweed bug, *Oncopeltus fasciatus* (Dallas)
(3) Confused flour beetle, *Tribolium confusum* (Duval)
(4) House fly, *Musca domestica* (Linn.)

The procedure for insects 1, 2, 3 and 4 is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The confused flour beetles are confined in Petri dishes without food. The caged insects are sprayed with the active compound at various concentrations. After twenty-four and seventy-two hours, counts are made to determine living and dead insects.

House fly evaluation tests differ in this respect: the toxicant is dissolved in a volatile solvent, preferably acetone, the active compound is pipetted into a Petri dish bottom, allowed to air dry and placed in a cardboard mailing tube. Twenty-five female flies are caged in the tube. The flies are continuously exposed to the known residue of the active compound in the cage. After twenty-four and seventy-two hours, counts are made to determine living and dead insects. The LD-50 values are calculated using well-known procedures.

The following table illustrates the insecticidal and acaricidal activity of the compounds of the present invention. The LD-50 values are expressed in micrograms, or in percent when applied as a spray.

TABLE I

|  | Compound I | Compound II | Compound III |
| --- | --- | --- | --- |
| House Flies | <10μg | 10μg | 10μg |
| American Roach | 0.025% | 0.025% | 0.05-0.1% |
| Milkweed Bug | 0.05% | X | 0.1% |
| Confused Flour Beetle | 10-100μg | 10-100μg | 0.1% |
| Two-Spotted Mite | 0.06% | 0.06% | ¹ 0.25 |
| Two-Spotted Mite Eggs | X | 0.06% | ¹ 0.25 |

¹ These figures yielded 100% kills.
X represents low activity.

The nematocidal activity of the compounds of the present invention is illustrated by tests on O-ethyl-S-phenylethylphosphonodithioate, Compound II above. When applied to the soil at concentrations as low as ten parts per million, the compound produced 100% mortality against root-knot nematodes. Even at a concentration of five parts per million, it was highly active, but gave somewhat less than 100% mortality. Furthermore, even at relatively high concentrations the compound is non-toxic to plants.

What is claimed is:

1. As a new composition of matter a compound having the formula

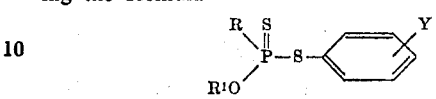

wherein R and R¹ are selected from the group consisting of methyl and ethyl and Y is selected from the group consisting of hydrogen and alkyl groups having up to four carbon atoms.

2. As a new composition of matter: O-ethyl-S-p-tolyl-ethylphosphonodithioate.

3. As a new composition of matter: O-ethyl-S-o-tolyl-ethylphosphonodithioate.

4. As a new composition of matter: O-ethyl-S-phenyl-ethylphosphonodithioate.

5. As a new composition of matter: O-ethyl-S-(p-tert.-butylphenyl)-ethylphosphonodithioate.

6. As a new composition of matter: O-methyl-S-phenyl-ethylphosphonodithioate.

7. As a new composition of matter: O-ethyl-S-phenyl-methylphosphonodithioate.

8. A method of killing pests comprising applying to a pest habitat a composition containing as the essential active ingredient a compound having the formula

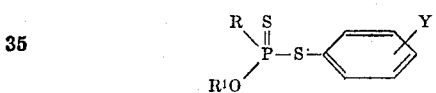

wherein R and R¹ are selected from the group consisting of methyl and ethyl and Y is selected from the group consisting of hydrogen and alkyl groups having up to four carbon atoms.

9. A method of killing pests comprising applying to a pest habitat a composition containing as the essential active ingredient O-ethyl-S-p-tolyl-ethylphophonodithioate.

10. A method of killing pests comprising applying to a pest habitat a composition containing as the essential active ingredient O-ethyl-S-o-tolyl-ethylphosphonodithioate.

11. A method of killing pests comprising applying to a pest habitat a composition containing as the essential active ingredient O-ethyl-S-phenyl-ethylphosphonodithioate.

12. A method of killing pests comprising applying to a pest habitat a composition containing as the essential active ingredient O-ethyl-S-(p-tert.-butylphenyl)-ethylphosphonodithioate.

13. A method of killing pests comprising applying to a pest habitat a composition containing as the essential active ingredient O-methyl-S-phenyl-ethylphosphonodithioate.

14. A method of killing pests comprising applying to a pest habitat a composition containing as the essential active ingredient O-ethyl-S-phenyl-methylphosphonodithioate.

15. A method for preparing a compound having the formula

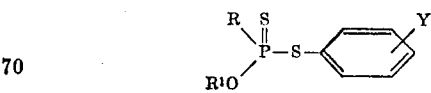

wherein R and R¹ are selected from the group consisting of methyl and ethyl and Y is selected from the group consisting of hydrogen and alkyl groups having up to four carbon atoms, comprising reacting a compound having the formula

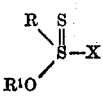

wherein X is selected from the group consisting of chlorine and bromine with a compound selected from the group consisting of thiophenol and alkyl substituted thiophenols.

References Cited in the file of this patent

UNITED STATES PATENTS 2,910,402    Fairchild _____ Oct. 27, 1959

FOREIGN PATENTS 1,181,375    France _____ June 15, 1959
814,152    Germany _____ July 8, 1949

Disclaimer 2,988,474.—*Karoly Szabo*, Yonkers, N.Y., and *John G. Brady*, and *Thomas Bruce Williamson*, Santa Clara, Calif. NOVEL INSECTICIDES, ACARICIDES AND NEMATOCIDES. Patent dated June 13, 1961. Disclaimer filed May 12, 1966, by the assignee, *Stauffer Chemical Company*.

Hereby enters this disclaimer to claims 6 and 7 of said patent.
[*Official Gazette October 4, 1966.*]

UNITED STATES PATENT OFFICE
CERTIFICATE OF CORRECTION

Patent No. 2,988,474      Dated June 13, 1961

Inventor(s) Karoly Szabo, John G. Brady and Thomas Bruce Williamson

It is certified that error appears in the above-identified patent and that said Letters Patent are hereby corrected as shown below:

Column 5, that portion of the formula reading:

$$\begin{array}{c}\phantom{x}\\ \phantom{x}\end{array}\!\!>\!\!\overset{\overset{\displaystyle S}{\|}}{S}-$$    should read    $$\begin{array}{c}\phantom{x}\\ \phantom{x}\end{array}\!\!>\!\!\overset{\overset{\displaystyle S}{\|}}{P}-$$

SIGNED AND SEALED
MAR 17 1970

(SEAL)
Attest:

Edward M. Fletcher, Jr.
Attesting Officer

WILLIAM E. SCHUYLER, JR.
Commissioner of Patents